United States Patent
Park et al.

(10) Patent No.: US 8,067,897 B2
(45) Date of Patent: Nov. 29, 2011

(54) BACKLIGHT ASSEMBLY AND METHOD OF DRIVING THE SAME

(75) Inventors: Se-Ki Park, Suwon-si (KR); Si-Joon Song, Suwon-si (KR); Gi-Cherl Kim, Yongin-si (KR); Young-Keun Lee, Cheonan-si (KR)

(73) Assignee: Samsung Electronics Co., Ltd. (KR)

( * ) Notice: Subject to any disclaimer, the term of this patent is extended or adjusted under 35 U.S.C. 154(b) by 372 days.

(21) Appl. No.: 12/355,342

(22) Filed: Jan. 16, 2009

(65) Prior Publication Data

US 2010/0052564 A1  Mar. 4, 2010

(30) Foreign Application Priority Data

Aug. 28, 2008 (KR) .................................. 2008-84607

(51) Int. Cl.
- *G05G 1/00* (2006.01)
- *H05B 37/02* (2006.01)
- *H05B 39/04* (2006.01)
- *H05B 41/36* (2006.01)

(52) U.S. Cl. ......... 315/291; 315/294; 315/295; 315/307

(58) Field of Classification Search .................. None
See application file for complete search history.

(56) References Cited

U.S. PATENT DOCUMENTS

| | | | | |
|---|---|---|---|---|
| 2007/0013647 | A1* | 1/2007 | Lee et al. | 345/102 |
| 2007/0176886 | A1* | 8/2007 | Nagasawa | 345/102 |
| 2007/0236447 | A1* | 10/2007 | Lee et al. | 345/102 |
| 2007/0262727 | A1* | 11/2007 | Suzuki et al. | 315/219 |

FOREIGN PATENT DOCUMENTS

| | | |
|---|---|---|
| JP | 2008-071603 | 3/2008 |
| KR | 10-2007-0100040 | 10/2007 |
| KR | 10-2007-0100631 | 10/2007 |

* cited by examiner

*Primary Examiner* — Anh Tran
(74) *Attorney, Agent, or Firm* — Innovation Counsel LLP

(57) ABSTRACT

A backlighting assembly for an LCD display is divided into a plurality of selective dimming areas each having a respective plurality of light generating blocks. A plurality of driving units supply power to the light generating blocks. The light generating blocks are grouped into light source groups. Each of the driving units supplies power to at least one light generating block in a first light source group and a second light generating block in a second light source group but not to all the light generating blocks in any one light source group. Light generating blocks connected to a same driving unit may be distributedly arranged to be nonadjacent to one another. Plural driving units are used to fully power a brightly lit one dimming area, thereby reducing the loads on the individual driving units and preventing overheating.

19 Claims, 6 Drawing Sheets

BACKLIGHT ASSEMBLY AND METHOD OF DRIVING THE SAME

CROSS-REFERENCE TO RELATED APPLICATION

This application relies for priority upon Korean Patent Application No. 2008-84607 filed on Aug. 28, 2008, the contents of which are herein incorporated by reference in its entirety.

BACKGROUND

1. Field of Invention

The present disclosure of invention relates to a backlight assembly and a method of driving the same. More particularly, the present disclosure relates to a backlight assembly capable of performing a local dimming and a method of driving the backlight assembly.

2. Description of Related Technology

In general, a liquid crystal display (LCD) includes a liquid crystal display panel to display an image and a backlight assembly to supply a light to the liquid crystal display panel from a back side of the LCD panel. The backlight assembly may employ one or more cold cathode fluorescent lamps as its light source or other sources such a light emitting diodes (LEDs).

In order to increase a contrast ratio of a displayed image or reduce power consumption of the backlight assembly, recently various selective dimming methods have been applied to the liquid crystal display to control brightness of the backlight assembly.

As one of the dimming methods, a local dimming method sets dimming areas of a display panel, calculates gray-scale values of images respectively displayed in the dimming areas, and controls brightness of light emitted from the backlight assembly for those dimming areas according to the calculated gray-scale values. In the local dimming method, the backlight assembly increases the brightness of light supplied to areas in which the gray-scale value is relatively high and decreases the brightness of light supplied to areas in which the gray-scale value is relatively low.

The backlight assembly to which the local dimming method is applied is divided into a plurality of light generating blocks and includes a plurality of driving units that control the brightness of light emitted from each light generating block for its respective dimming area. However, if plural light generating blocks are connected to a specific driving unit and the plural light generating blocks are simultaneously brightened in concentrated fashion, overheating may occur in the specific driving unit, so that long term reliability of the specific driving unit is lowered. In addition, the specific driving unit may not be able to supply all the power that is needed to simultaneously brighten all the light generating blocks to a prespecified maximum brightness level when so needed according to a prespecified dimming method to boost the brightness of light emitted from the light generating blocks.

SUMMARY

In an exemplary embodiment, a backlight assembly supplies light to a display panel which is divided into a plurality of dimming areas. The backlight assembly includes a plurality of light generating blocks respectively corresponding to the dimming areas, and a plurality of driving units each capable of supplying variable power. The light generating blocks are subdivided into a plurality of light source groups. Each of the driving units supplies power to the light generating blocks included in at least two light source groups.

In another exemplary embodiment, a backlight assembly supplies light to a display panel divided into a plurality of dimming areas. The backlight assembly includes a plurality of light generating blocks corresponding to the dimming areas, respectively, and including a plurality of light sources, and a plurality of driving units. Each of the driving units supplies a power to at least one light source included in at least each of two light generating blocks.

In another exemplary embodiment, a method of driving a backlight assembly that supplies light to a display panel divided into a plurality of dimming areas is provided as follows. A plurality of light generating blocks corresponding to the dimming areas, respectively, is prepared and a plurality of driving units that supply power to the light generating blocks is prepared. The light generating blocks are grouped into a plurality of light source groups, and each driving unit is connected with at least two light generating blocks respectively included in at least two of the light source groups. Then, the power from each of the driving units is supplied to corresponding light generating blocks.

According to the above, the light generating blocks which are connected to a same first driving unit are distributedly arranged so as not to be immediately adjacent to one another but rather to have at least one other light generating block interposed therebetween and powered by a second driving unit. Accordingly, when maximum brightness is demanded from a dimming area including one of the light generating blocks which are connected to the first driving unit, the first driving unit will not have to supply power to all light generating block in that dimming area. The driving unit operated in this way may be prevented from being operated at maximum power for all light generating blocks in a given dimming area, in other words, in concentrated fashion, thereby preventing over-heat induced degradation of reliability of the specific driving units.

BRIEF DESCRIPTION OF THE DRAWINGS

The above and other advantages of the present disclosure of invention will become readily apparent by reference to the following detailed description when considered in conjunction with the accompanying drawings wherein.

DETAILED DESCRIPTION

Figure 1:
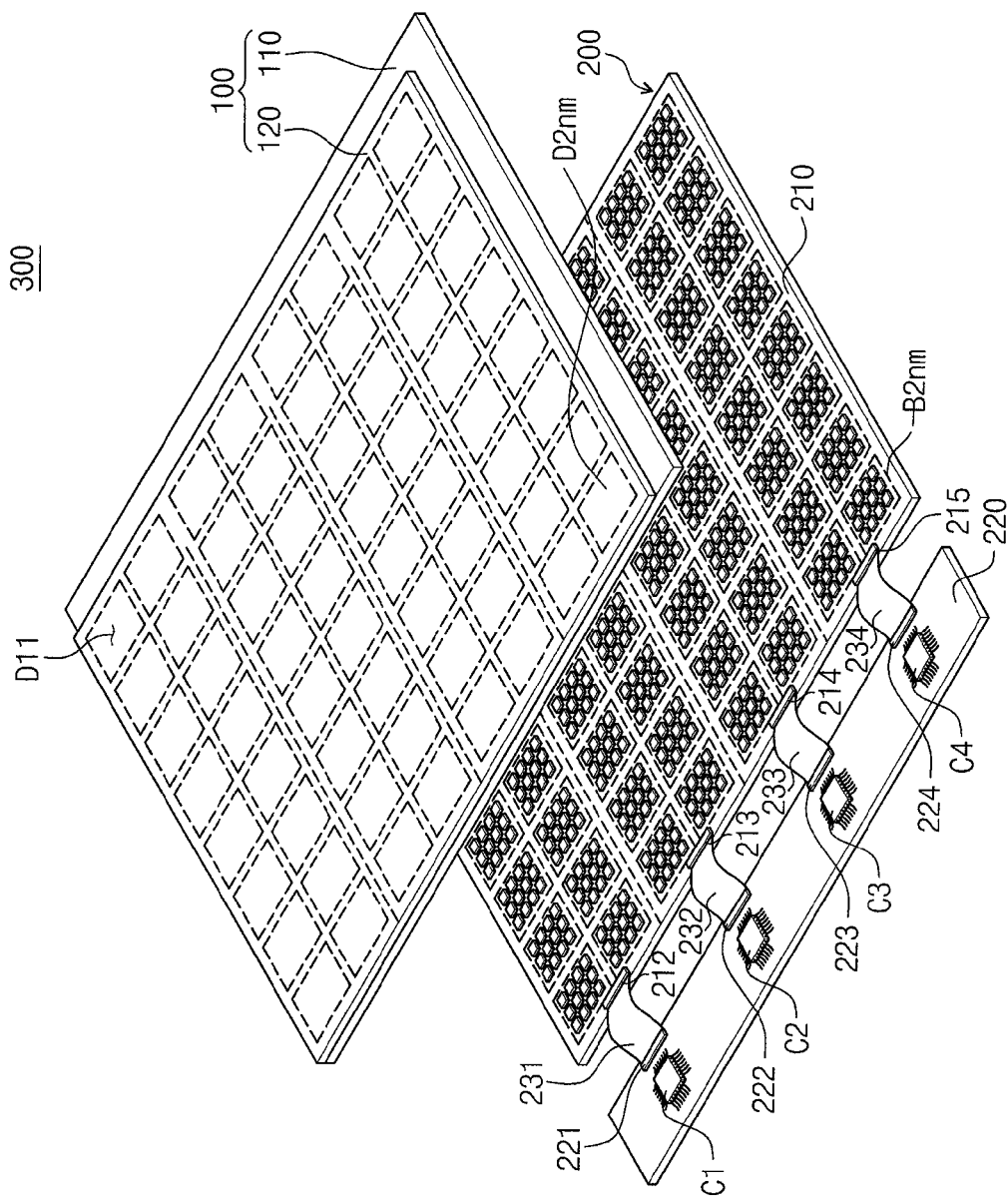
FIG. 1 is a perspective view showing an exemplary embodiment of a display apparatus employing a backlight assembly according to the present disclosure.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
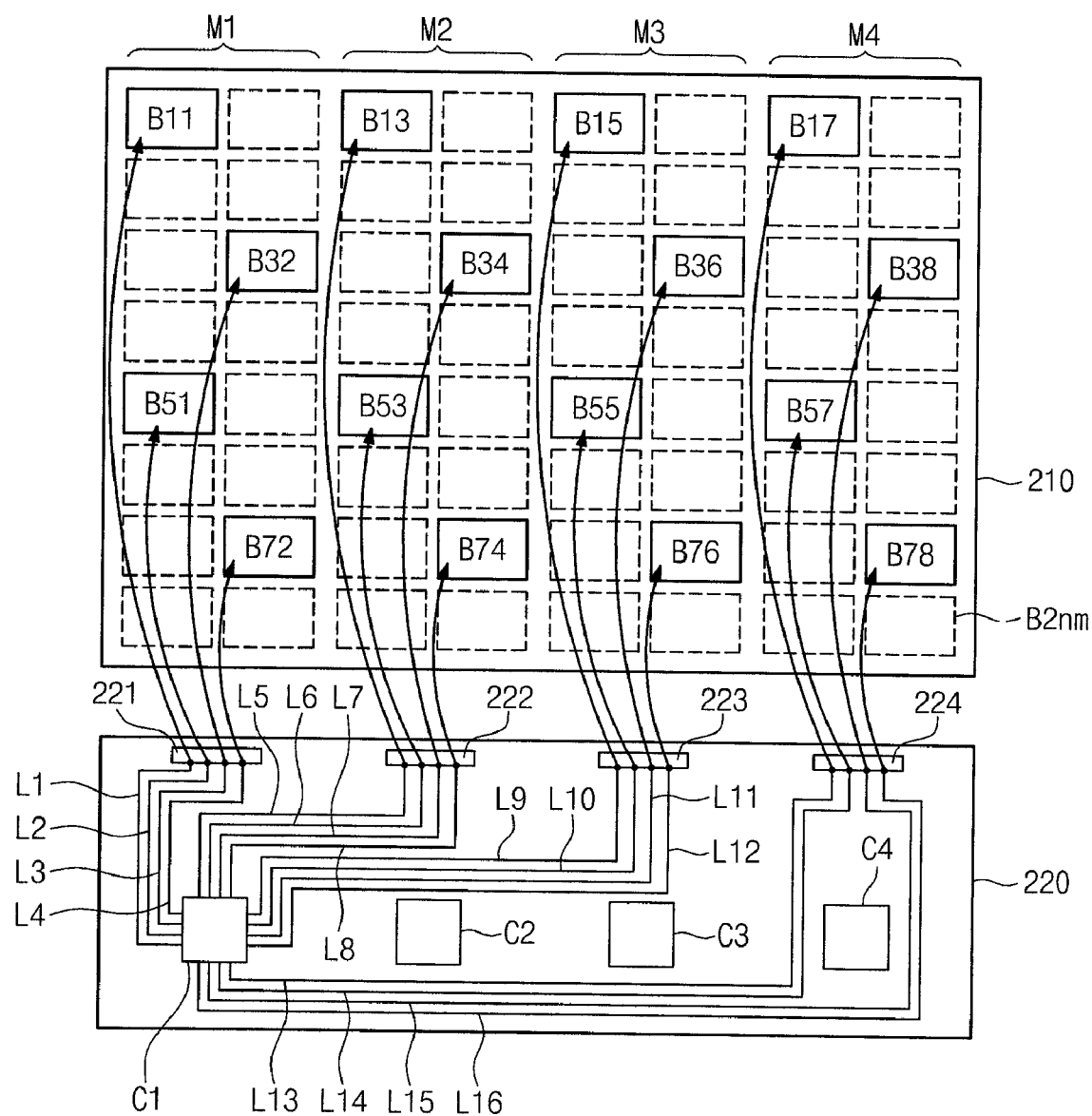
FIG. 2 is a plan view showing a backlight assembly of FIG. 1.

FIG. 1 is a perspective view showing an exemplary embodiment of a display apparatus employing a backlight assembly, and FIG. 2 is a plan view showing a backlight assembly of FIG. 1.

Referring to FIGS. 1 and 2, a display apparatus 300 includes a display panel 100 that displays an image and a backlight assembly 200 disposed under the display panel 100 to supply a light to the display panel 100.

The display panel 100 includes a first substrate 110, a second substrate 120, and a liquid crystal layer (not shown) interposed between the first and second substrates 110 and 120. The first substrate 110 includes a plurality of pixel units arranged in a matrix. Each pixel unit includes a thin film transistor (TFT) and a pixel electrode. The second substrate 120 includes a color filter layer and a common electrode corresponding to the pixels. Portions of the liquid crystal layer are aligned selectively by electric fields generated between the pixel electrodes and the common electrode, so that the liquid crystal layer may control transmittance of the light from the backlight assembly. Accordingly, the display panel 100 may display desired images using the light having the controlled light transmittance.

The display panel 100 may be divided into a 2n×m matrix of dimming areas $D11 \sim D2nm$, in which n and m represent natural numbers of not less than 1. The backlight assembly 200 includes 2n×m light generating blocks $B11 \sim B2nm$ corresponding to the 2n×m dimming areas $D11 \sim D2nm$, respectively, to control brightness of the light applied to the 2n×m dimming areas $D11 \sim D2nm$. In the present exemplary embodiment, the first number, n is 4 and the second number, m is 8.

Particularly, in the case where n=4, the backlight assembly 200 includes n driving units $C1 \sim C4$ (e.g., monolithic integrated circuits, which driving units $C1 \sim C4$ are hereinafter also referred to as the first to fourth driving units). The first to fourth driving units $C1 \sim C4$ are used to drive the 2n×m light generating blocks $B11 \sim B2nm$. The 2n×m light generating blocks $B11 \sim B2nm$ may be subdivided into n light source groups or units, $M1 \sim M4$ (hereinafter, referred to as first to fourth light source groups) where each such group has 2×m light generating blocks, but the blocks driven in each group (e.g., M1) by a same driving unit (e.g., C1) are not necessarily adjacent to one another as may be seen for example in FIG. 2 for the case of the first group, M1 (whose nonadjacent blocks B11, B32, B51, and B72 of respective nonadjacent rows 1, 3, 5 and 7 are driven by the first driving unit C1).

In one embodiment, each light source group $M1 \sim M4$ includes the light generating blocks of a respective rectangular area having 2 columns by 8 rows. In addition, each light generating block $B11 \sim B2nm$ includes a plurality of light sources 211 (see FIG. 4). In the present exemplary embodiment, each light source 211 may be a light-emitting diode, and each light generating block $B11 \sim B2nm$ includes twelve such light-emitting diodes (LEDs) arranged therein.

The number of the light generating blocks $B11 \sim B2nm$ may be varied depending on the size of the display panel 100 and the size of the dimming area defined on the display panel 100. The number of the light-emitting diodes in each light generating block $B11 \sim B2nm$ may be varied depending on the size of each light generating block $B11 \sim B2nm$.

Meanwhile, each driving unit $C1 \sim C4$ may include a driver IC or the like having 2×m selective drive channels. In other words, each driver unit $C1 \sim C4$ is electrically connected to at least two light generating blocks where these blocks are included in at least two light source groups among the first to fourth light source groups, $M1 \sim M4$.

In FIGS. 1 and 2, since each driving unit $C1 \sim C4$ includes a driver IC having just 2×m channels, the backlight assembly 200 of this embodiment needs to have n such driving units in order to selectively drive the 2n×m light generating blocks $B11 \sim B2nm$. However, if in another embodiment each driving unit $C1 \sim C4$ were to include a driver IC having more than 2×m channels, then the number of driving units needed for driving the 2n×m light generating blocks $B11 \sim B2nm$ can be reduced to less than the n.

As shown in FIGS. 1 and 2, each driver IC $C1 \sim C4$ is electrically connected to sixteen light generating blocks included in the first to fourth light source groups $M1 \sim M4$. In other words, the light generating blocks connected to the same driver IC of the driver ICs $C1 \sim C4$ are distributed nonadjacently in the first to fourth light source groups $M1 \sim M4$.

In addition, the light generating blocks, which are arranged in a same light source group (e.g., one of $M1 \sim M4$) and are connected to a same driver IC (e.g., C1) are nonadjacent and are distant one from the next by a predetermined distance.

That is, at least one light generating block, which is connected to another driver IC (e.g., C2) is interposed between the light generating blocks arranged in the same light source group (e.g., M1) and connected to the same driver IC (e.g., C1). As a result, the light generating blocks which are directly adjacent to each other in each of the light source groups are connected to be selectively driven by different driver ICs.

In the illustrated embodiment of FIG. 1, the backlight assembly 200 further includes a first printed circuit board 210 corresponding to the display panel 100, a second printed circuit board 220 arranged adjacent to the first printed circuit board 210, and first, second, third and fourth flexible interconnects 231, 232, 233 and 234 connected between the first and second printed circuit boards 210 and 220.

The 2n×m light generating blocks B11~B2nm are defined on the first printed circuit board 210, and the light-emitting diodes 211 of the light generating blocks B11~B2nm are mounted on the first printed circuit board 210. The twelve light-emitting diodes in each light generating block B11~B2nm are arranged in 3 rows by 4 columns.

The first printed circuit board 210 is provided with first, second, third and fourth connectors 212, 213, 214 and 215 which respectively carry signals corresponding to the first to fourth light source groups M1~M4, respectively. Each of the first to fourth connectors 212~215 receives a respective plurality of signals which are applied to corresponding light source units in respective ones of the first to fourth light source groups M1~M4, where the respective pluralities of signals are supplied respectively from corresponding ones of the first to fourth flexible interconnects 231, 232, 233, and 234.

The first to fourth driver ICs C1~C4 are mounted on the second printed circuit board 220, and the second printed circuit board 220 is provided with fifth, sixth, seventh and eighth connectors 221, 222, 223 and 224. The fifth to eighth connectors 221~224 are respectively electrically connected to the first to fourth connectors 212~215 through the first to fourth flexible interconnects 231, 232, 233 and 234.

In addition, the second printed circuit board 220 includes signal lines to transmit signals from each of the first to fourth driver ICs 221~224 to the fifth to eighth connectors 221~224. In FIG. 2, first to sixteenth signal lines L1~L16 that connect the first driver IC C1 to the fifth through eighth connectors 221~224 have been shown as a representative example.

As shown in FIG. 2, the first driver IC C1 is connected to the fifth connector 221 through the first to fourth signal lines L1~L4, and the fifth connector 221 is connected to the first connector 212 through the first flexible interconnect circuit 231. Thus, the signals output from the first driver IC C1 are applied to the four light generating blocks B11, B32, B51 and B72 respectively arranged in the odd rows of the first light sources group M1.

Meanwhile, the first to eighth signal lines L5~L8 are respectively connected to the four light generating blocks B13, B34, B53 and B74 respectively arranged in the odd rows of the second light sources group M2 through the sixth connector 222, the second flexible interconnect circuit 232 and the second connector 213. The ninth to twelfth signal lines L9~L12 are respectively connected to the four light generating blocks B15, B36, B55 and B76 respectively arranged in the odd rows of the third light sources group M3 through the seventh connector 223, the third flexible interconnect circuit 233 and the third connector 214. The thirteenth to sixteenth signal lines L13~L16 are respectively connected to four light generating blocks B17, B38, B57 and B78 respectively arranged in the odd rows of the fourth light sources group M4 through the eighth connector 224, the fourth flexible interconnect circuit 234 and the fourth connector 215. Accordingly, the light generating blocks receiving the signals from the first driver IC C1 may be distributed among the first to fourth light source groups M1~M4 as well as being nonadjacent from each other at least in each light source group.

In FIG. 2, only the connection structure of the first to sixteenth signal lines L1~L16 that connect the first driver IC C1 with the fifth to eighth connectors 221~224 has been shown, however each of the second, third and fourth driver ICs C2, C3 and C4 may be connected to the fifth to eighth connectors 221~224 similar to the connection structure of the first to sixteenth signal lines L1~L16 but shifted so the connection arrowheads terminate in the dashed boxes representing other blocks rather than in the solid boxes representing blocks B11, B13, B15, etc.

In addition, the second printed circuit board 220 may include a multilayer printed circuit board containing two or more interconnect layers each of which is provided with the signal lines. Thus, although the signal lines are connected between the fifth to eighth connectors 221~224 and the first to fourth driver ICs C1~C4 in complex fashion, the signal lines may be prevented from being shorted to each other since the signal lines are arranged on the two or more layers of the multilayer printed circuit board.

The first printed circuit board 210 includes signal lines to transmit signals applied to the first to fourth connectors 212~215 to the light generating blocks. The connection structure of the signal lines arranged on the first printed circuit board 210 will be described later with reference to FIG. 4.

Dimming control circuits may be used to selectively control brightness of respective backlight assembly areas in order to for example increase a contrast ratio of the images displayed on the display panel or to reduce the power consumption of the backlight assembly. One local dimming method among various dimming methods defines the dimming areas of the display panel, calculates gray-scale values of images respectively displayed in the dimming areas, and controls brightness of light emitted from the backlight assembly according to the calculated gray-scale values of the respective dimming areas.

In detail, when a gray-scale value to be emitted by a specific dimming area is relatively high, the brightness of the light emitted from the corresponding light generating blocks increases so as to supply the needed amount of bright backlighting. On the other hand, when the highest to-be-emitted gray-scale value of the specific dimming area is relatively low, the brightness of the light emitted from the corresponding light generating blocks can be decreased so as to supply not much more than the needed amount of backlighting for the highest to-be-emitted gray-scale value. Accordingly, the brightness of the light emitted from each of the light generating blocks may be selectively controlled by for example adjusting a duty cycle ratio of a pulsed driving signal applied to the LEDs of the light generating blocks.

As shown in FIG. 2, the light generating blocks receiving the driving signals from the first to fourth driver ICs C1~C4 are distributed in the first to fourth light source groups M1~M4 as well as distant from each other in the same light source unit. Thus, all the first to fourth driver ICs C1~C4 may be used to turn on all the light-emitting diodes arranged in the first light source unit M1.

As described above, since the light generating blocks receiving the driving signals from the first to fourth driver ICs C1~C4 are evenly distributed in the first to fourth light source groups M1~M4, all channels of a specific driver IC among the first to fourth driver ICs C1~C4 may generally be prevented from being all operated at high duty ratio when performing local dimming. Accordingly, the average load placed on each of the first to fourth driver ICs C1~C4 may be reduced, thereby preventing degradation of reliability of the specific driver IC among the first to fourth driver ICs C1~C4 due to prolonged overheating.

Figure 3:
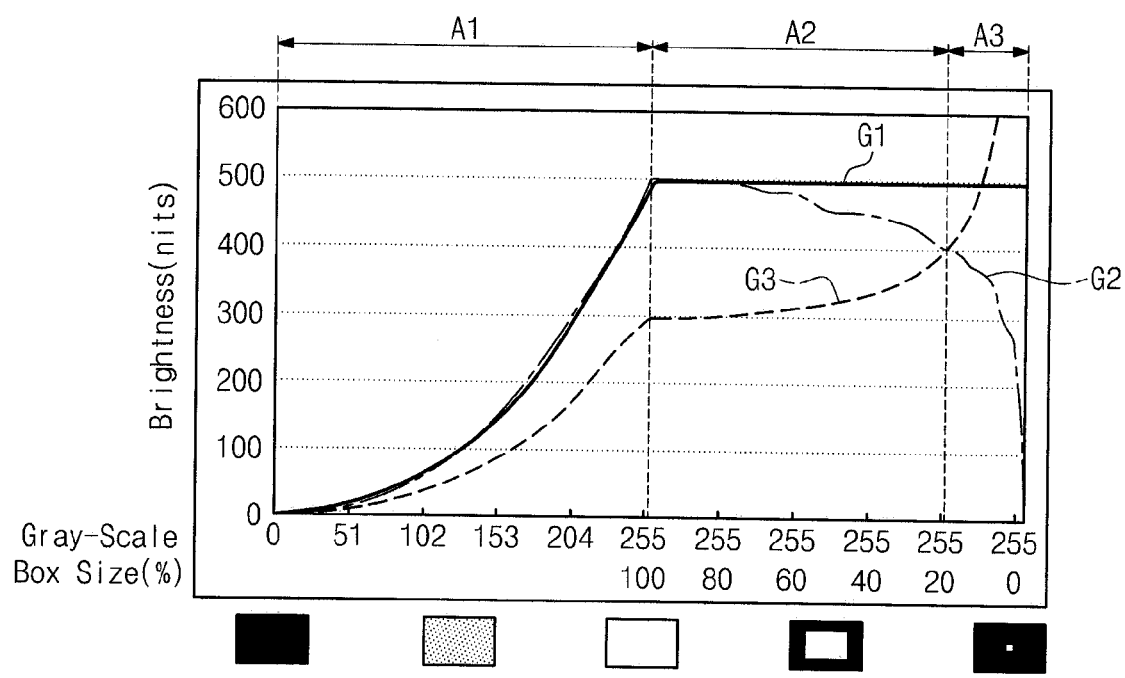
FIG. 3 is a graph illustrating an adaptive luminance and power control driving scheme.

FIG. 3 is a graph illustrating an adaptive luminance and power control driving scheme.

In FIG. 3, an x-axis represents a gray-scale and a y-axis represents brightness (nits). Also, a first graph plot G1 represents brightness of a backlight assembly according to the gray-scale in a conventional display apparatus, a second graph plot G2 represents brightness of a backlight assembly according to the gray-scale in a display apparatus to which the local dimming method is applied, and a third graph plot G3 represents brightness of a backlight assembly according to the gray-scale in a display apparatus to which the adaptive luminance and power control (hereinafter, referred to as ALPC) driving scheme is applied.

In FIG. 3, the display apparatus has a full-scale display range (0 to 255 discrete gray-scale levels), and a box size (%) represents a ratio of a white area to a black background area. That is, when the box size is 50%, the ratio of the white area to the black background area is 50%, and when the box size is 10%, the ratio of the white area to the black background area is 10%.

As shown in FIG. 3, the conventional display apparatus gradually increases the brightness of light emitted by the backlight assembly in a first area A1 during which the gray-scale is changed from low gray-scale (o) to high gray-scale (255). In addition, the display apparatus employing the local dimming method gradually increases the brightness of the backlight assembly in the first area A1. Meanwhile, the conventional display apparatus (G1) maintains the brightness of the backlight assembly at about 500 nits in second and third areas A2 and A3 during which the gray-scale is maintained at high gray-scale.

However, the display apparatus to which the local dimming method (G2) is applied gradually reduces the brightness of the backlight assembly to about 400 nits in the second area A2 in which the box size is equal to or greater than 20%, and gradually reduces the brightness of the backlight assembly to under 100 nits in the third area A3 in which the box size is smaller than 20%. Thus, the local dimming method (G2) reduces the brightness of the backlight assembly as the white area is reduced, so that the power consumption in the backlight assembly is reduced.

Meanwhile, the display apparatus to which the ALPC driving scheme (G3) is applied more reduces the brightness of the backlight assembly in the first area A1 than the conventional display apparatus (G1) and the display apparatus employing the local dimming method (G2). Accordingly, the display apparatus employing the ALPC driving scheme (G3) may display more smooth images than those displayed in the conventional display apparatus and the display apparatus employing the local dimming method, so that a dazzling phenomenon of an image may be prevented.

In addition, the display apparatus to which the ALPC driving scheme is applied gradually increases the brightness of the backlight assembly in the second area A2. That is, as the white area is reduced relative to black area in the second area A2, the brightness of the backlight assembly, which is supplied to the white area, increases to 400 nits in maximum. Also, in the third area A2 in which the white area is smaller than 20%, the brightness of the backlight assembly increases to 600 nits (for plot G3) which is beyond 500 nits that is a maximum brightness of a conventional backlight assembly. Therefore, the display apparatus employing the ALPC driving scheme may more vividly express the white area.

In case that the ALPC driving scheme is applied to the display apparatus, in order to boost the brightness of the specific light generating blocks of the backlight assembly corresponding to the white area, the driver IC connected to the specific light generating blocks applies a voltage higher than a normal voltage to the specific light generating blocks.

To this end, each driver IC needs some extra power. However, if all channels of each driver IC are operated at the high duty ratio, the extra power is difficult to be applied to the specific light generating blocks. Accordingly, the light generating blocks connected to the same driver IC are distributed as the above-described, and thus all channels of each driver IC among the first to fourth driver ICs C1~C4 may be prevented from being simultaneously operated at the highest duty ratio. As a result, the extra power may be sufficiently supplied to the light generating blocks that require the extra power, thereby effectively boosting the brightness for the specific white area in the display apparatus employing the ALPC driving scheme.

Figure 4:
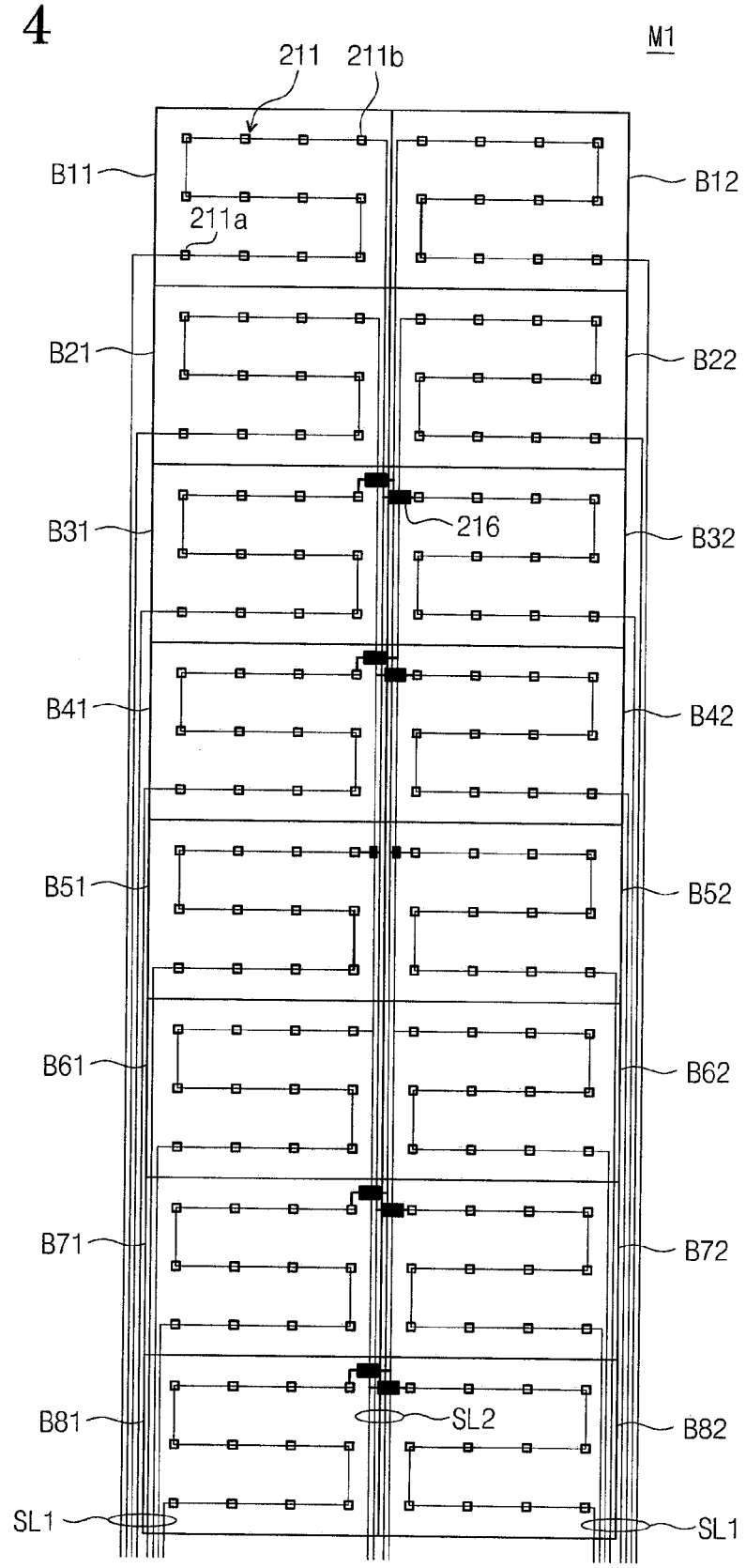
FIG. 4 is a plan view showing a layout of signal lines arranged in a first light source unit of FIG. 2.
Figure 5:
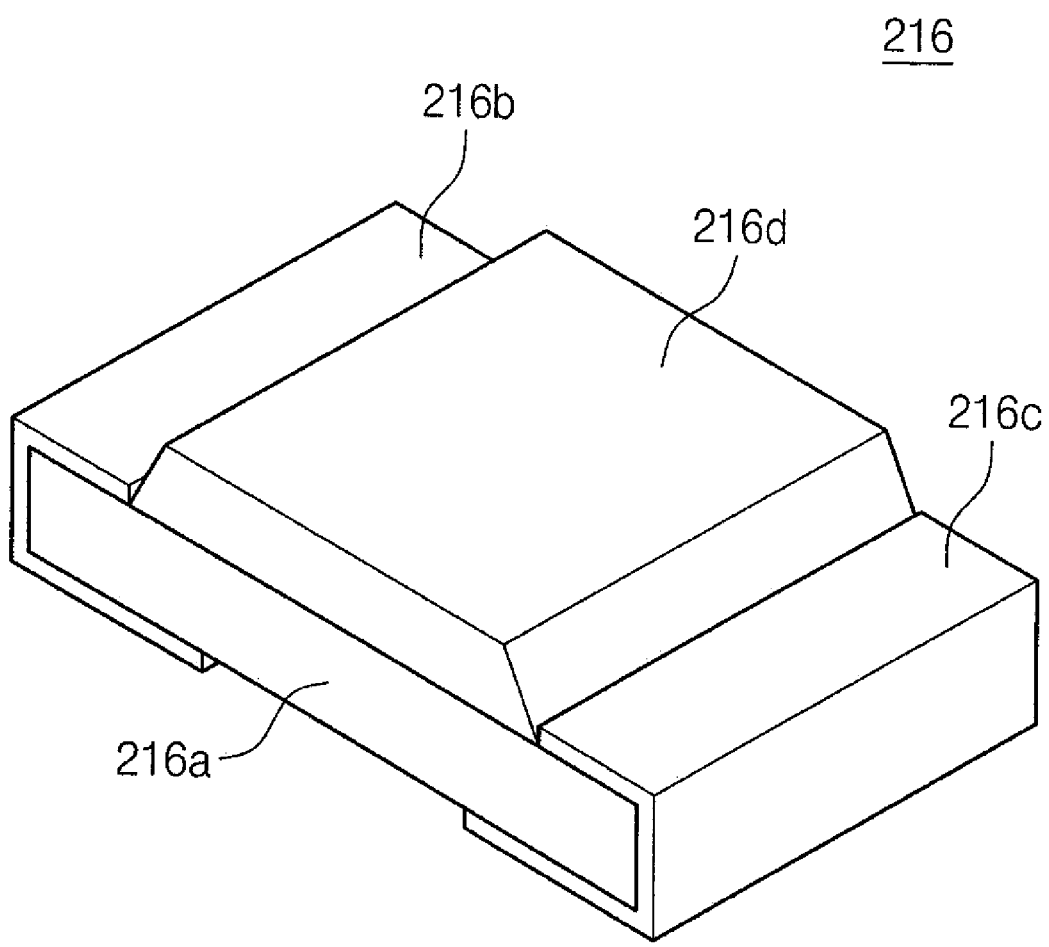
FIG. 5 is a perspective view showing a dummy resistor of FIG. 4.

FIG. 4 is a plan view showing a layout of signal lines arranged in a first light source unit of FIG. 2, and FIG. 5 is a perspective view showing a dummy resistor 216 of FIG. 4.

Referring to FIG. 4, the first light sources group M1 includes the first to sixteenth light generating blocks B11~B82 arranged therein, and each of the first to sixteenth light generating blocks B11~B82 includes twelve light-emitting diodes 211 arranged in 3 columns by 4 rows. In the illustrated embodiment, the twelve light-emitting diodes 211 arranged in each of the light generating blocks B11~B82 are electrically connected to each other in series. That is, each light-emitting diode 211 includes a first input terminal and a second input terminal, and the first input terminal of each light-emitting diode 211 is electrically connected to the second input terminal of adjacent light-emitting diode thereto, so that the twelve light-emitting diodes 211 may be connected to each other in series. In the present exemplary embodiment, a first light-emitting diode 211a and a last light-emitting diode 211b of the twelve light-emitting diodes 211 arranged in each of the light generating blocks B11~B82 are connected to a first signal line SL1 and a second signal line SL2, respectively.

The first signal line SL1 receives a first voltage from a corresponding driver IC of the driver ICs C1~C4, and the second signal line SL2 receives a second voltage from a DC/DC converter (not shown), which is higher than the first voltage. The DC/DC converter may be mounted on the second printed circuit board 220 shown in FIG. 2.

The first to sixteenth light generating blocks B11~B82 are arranged in 2 columns by 8 rows in the first light sources group area M1. Accordingly, the first to eighth light generating blocks B11, B21, B31, B41, B51, B61, B71 and B81 are arranged in a left portion of the first light sources group area M1, and the ninth to sixteenth light generating blocks B12, B22, B32, B42, B52, B62, B72 and B82 are arranged in a right portion of the first light sources group area M1.

The first signal lines SL1 connected to first input terminals of the first to eighth light generating blocks B11~B81 extend along to the left portion of the first and eighth light generating blocks B11~B81 (hereinafter, referred to as left-sided block) and are extended toward the first connector 212 (see FIG. 1) mounted on the first printed circuit substrate 210 (see FIG. 1). The first signal lines SL1 connected to first input terminals of the ninth to sixteenth light generating blocks B12~B82 extend along the right portion of the ninth to sixteenth light generating blocks B12~B82 (hereinafter, referred to as right-sided block) and are extended toward the first connector 212 (see FIG. 1) mounted on the first printed circuit substrate 210 (see FIG. 1).

Meanwhile, four second signal lines SL2 are arranged to extend in the middle between the left-sided blocks B11~B81 and the right-sided blocks B12~B82. Each of the second signal lines SL2 is connected to the light generating blocks connected to the same driver IC. In the present exemplary embodiment, each of the second signal lines SL2 arranged between the left-sided blocks B11~B81 and the right-sided blocks B12~B82 is connected to four light generating blocks. For instance, the second signal line SL2 withdrawn from the first light generating block B11 is commonly connected with the second input terminals of the fourth light generating block B51, the eleventh light generating block B32, and the fifth light generating block B72.

The first printed circuit board 210 may be a single layer printed circuit board of which signal lines are formed on a single layer. In one embodiment, the first printed circuit board 210 further includes a bridging element (dummy resistor) 216 in order to electrically connect each second signal line SL2 with corresponding four light generating blocks of the first to sixteenth light generating blocks B11~B82.

As shown in FIG. 5, the dummy resistor 216 includes an insulating body 216*a*, a first terminal 216*b*, a second terminal 216*c*, and a resistance body 216*d*.

The first terminal 216*b* is positioned at a first end of the insulating body 216*a* and connected to a corresponding second signal line of the second signal lines SL2, and the second terminal 216*c* is positioned at a second end of the insulating body 216*a* and connected to the second input terminal of the corresponding light generating block. The resistance body 216*d* is positioned on a surface of the insulating body 216*a* to connect the first terminal 216*b* with the second terminal 216*c*.

The dummy resistor 216 has a resistance of approximately 0 (zero) Ω, and each of the second signal lines SL2 is electrically connected to only the second input terminal of the corresponding light generating block by the dummy resistor 216.

Figure 6:
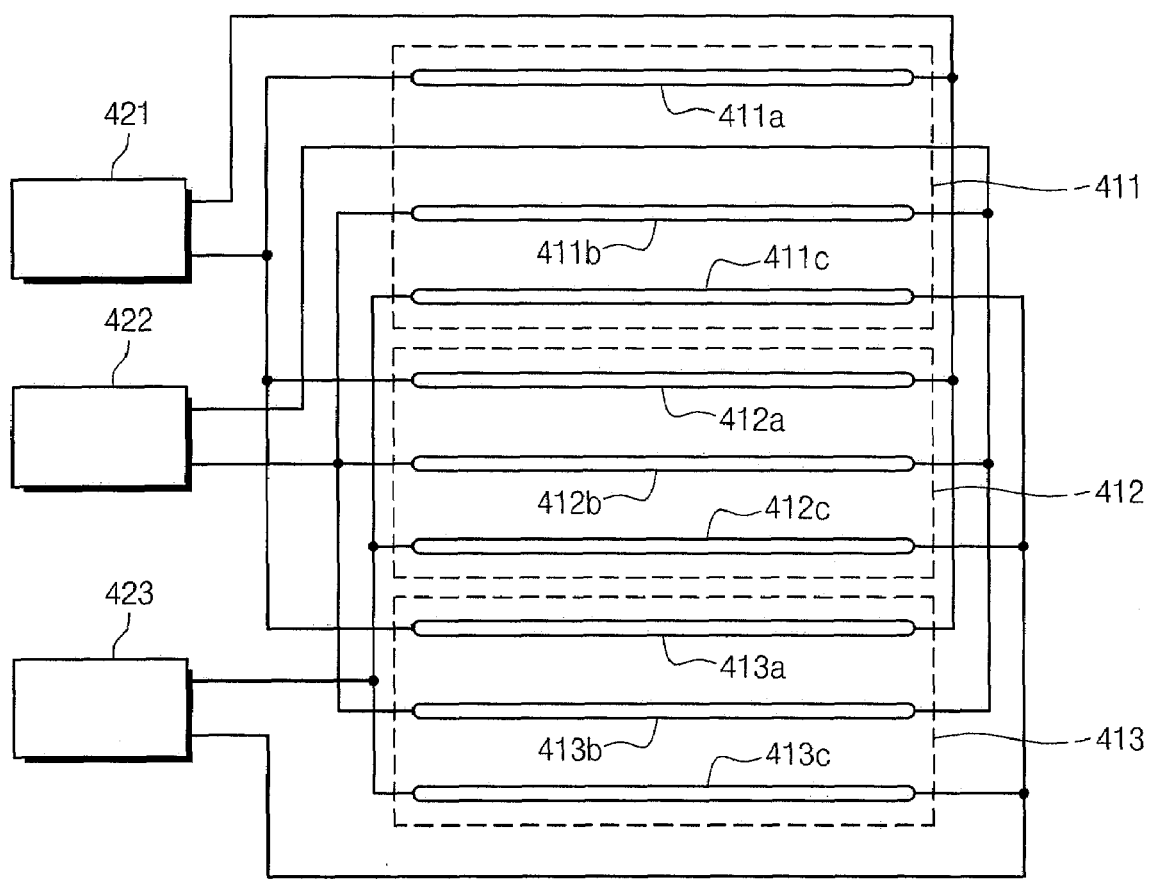
FIG. 6 is a plan view showing another exemplary embodiment of a backlight assembly.

FIG. 6 is a plan view showing another exemplary embodiment of a backlight assembly.

Referring to FIG. 6, when assuming that the display panel is divided into n dimming areas, a backlight assembly 400 includes n light generating blocks 411, 412 and 413 corresponding to the n dimming areas, respectively. In this exemplary embodiment, the n is defined as 3, and the n light generating blocks 411, 412 and 413 are defined as first, second and third light generating blocks, respectively. Each light generating block includes a plurality of cold cathode fluorescent lamps.

The backlight assembly 400 further includes first, second and third inverters 421, 422 and 423. The first to third inverters 421, 422 and 423 correspond to the first to third light generating blocks 411, 412 and 413, respectively. Each inverter supplies power to at least one cold cathode fluorescent lamp included in at least each of two light generating blocks but not to all light sources includes in each of the two light generating blocks. However, the present disclosure should not be limited to this exemplary embodiment.

As an example of the present invention, each of the inverters 421, 422 and 423 is electrically connected to three cold cathode fluorescent lamps respectively included in the first to third light generating blocks 411, 412 and 413. In detail, the first inverter 421 is connected to first cold cathode fluorescent lamps 411*a*, 412*a* and 413*a* respectively arranged in the first to third light generating blocks 411, 412 and 413, the second inverter 422 is connected to second cold cathode fluorescent lamps 411*b*, 412*b* and 413*b* respectively arranged in the first to third light generating blocks 411, 412 and 413, and the third inverter 423 is connected to third cold cathode fluorescent lamps 411*c*, 412*c* and 413*c* respectively arranged in the first to third light generating blocks 411, 412 and 413.

Thus, at least one cold cathode fluorescent lamp is positioned between the cold cathode fluorescent lamps connected to the same inverter that is different from the inverter to which the at least one cold cathode fluorescent lamp is connected. That is, the cold cathode fluorescent lamps adjacent to each other are respectively connected to different inverters. As a result, the load of the specific inverter of the first to third inverters 421, 422 and 423 may be reduced while performing the local dimming, thereby preventing degradation of reliability of the specific inverter among the first to third inverters 421, 422 and 423.

In case that the backlight assembly includes a surface light source or a carbon nano-tube as its light source, light sources connected to the same driving unit may be distributedly arranged as the above-described exemplary embodiments in FIGS. 1 to 6. Thus, the load of the driving units may be reduced while performing the local dimming, thereby effectively boost the brightness in the specific dimming area.

According to the above, the light generating blocks connected to the same driving unit are distributedly arranged. Accordingly, the light generating blocks connected to the specific driving unit may be prevented from being operated in concentrated, thereby preventing degradation of reliability of the specific driving unit.

In addition, the extra power may be sufficiently supplied to the light generating blocks that require the extra power needed to boost the brightness of the light generating block.

Although the exemplary embodiments have been described, it is understood that the present disclosure should not be limited to these exemplary embodiments but various changes and modifications can be made by one ordinary skilled in the art in view of the above and thus within the spirit and scope of the present disclosure of invention.

What is claimed is:

1. A backlight assembly configured to supply light to a specified display panel which is divided into a plurality of selectively controllable dimming areas, where the backlight assembly comprises:
   a plurality of selectively controllable light generating blocks respectively corresponding to the dimming areas; and
   a plurality of driving units each capable of supplying selectively variable power that can selectively control brightness of light respectively generated by respective ones of two or more of the light generating blocks,
   wherein the light generating blocks are grouped into a plurality of light source groups each having a mutually exclusive subset of two or more adjacent ones of the selectively controllable light generating blocks, and
   wherein each of the driving units is respectively coupled to supply selectively variable power to at least two respective and non-adjacent light generating blocks included in a respective at least two of the light source groups, where between the respective and non-adjacent light generating blocks powered by the respective driving unit there is disposed at least one light generating block that is not powered by the respective driving unit.

2. The backlight assembly of claim 1, wherein the number of driving units is equal to the number of the light source groups.

3. The backlight assembly of claim 2, wherein each of the driving units comprises a driver IC (integrated circuit) and each driver IC has a plurality of channels, and the number of channels of each driver IC is equal to the number of light generating blocks included in each of the light source groups.

4. The backlight assembly of claim 3, wherein light generating blocks which are immediately adjacent one to the next within each of the light source groups are respectively connected to different ones of the driver ICs so that immediately adjacent two light generating blocks of a given light source group are not driven by a same driver IC.

5. The backlight assembly of claim 1, further comprising a plurality of light sources arranged in each of the light generating blocks, and wherein the light sources comprise one or more light-emitting diodes (LEDs).

6. The backlight assembly of claim 5, further comprising a first circuit board on which the light sources are mounted.

7. The backlight assembly of claim 6, wherein the first circuit board comprises a plurality of signal lines to supply driving signals to the light generating blocks, and the signal lines are formed on a single layer.

8. The backlight assembly of claim 7, wherein:
the light sources included in each of the light generating blocks are connected to each other in series,
a first input terminal of a first light source of the series connected light sources included in each of the light generating blocks receives a first voltage, and a second input terminal of a last light source of the series connected light sources included in each of the light generating blocks receives a second voltage different than the first voltage.

9. The backlight assembly of claim 8, wherein the signal lines comprise a first signal line connected to the first input terminal and a second signal line connected to the second input terminal.

10. The backlight assembly of claim 8, wherein at least one of the signal lines is connected to the second input terminal of at least two light generating blocks of the light source groups and electrically connected to a corresponding driving unit of the driving units and the at least one so shared signal line extends between the light generating blocks that share it.

11. The backlight assembly of claim 10, wherein the first circuit board comprises at least one bridging connection member that connects the at least one signal line with one of the second input terminals.

12. The backlight assembly of claim 1, further comprising a second circuit board on which the driving units are mounted.

13. The backlight assembly of claim 12, wherein the second circuit board is a multi-layered circuit board and comprises a plurality of signal lines to supply a driving signal to the light source units from the driving units, and the signal lines are formed on multiple layers of the multi-layered circuit board.

14. A backlight assembly configured to supply light to a specified display panel divided into a plurality of selectively controllable dimming areas, the backlight assembly comprising:
a plurality of selectively controllable light generating blocks corresponding to the dimming areas, respectively, and each including a plurality of light sources; and
a plurality of driving units,
wherein each of the driving units is configured to respectively supply selectively variable power to a respective at least one light source respectively included in at least each of two light generating blocks.

15. The backlight assembly of claim 14, wherein the light sources comprise cold cathode fluorescent lamps.

16. The backlight assembly of claim 15, wherein the cold cathode fluorescent lamps adjacent to each other in each of the light generating blocks are connected to different driving units.

17. A method of driving a backlight assembly that supplies a light to a display panel divided into a plurality of selectively controllable dimming areas, the method comprising:
providing a plurality of selectively controllable light generating blocks disposed in corresponding relationship to the dimming areas, respectively;
providing a plurality of driving units that respectively supply variable power to the respective light generating blocks;
grouping the light generating blocks into a plurality of light source groups and connecting each driving unit with at least two non-adjacent light generating blocks respectively included in at least two of the light source groups; and
selectively supplying power from each of the driving units to correspondingly connected ones of the light generating blocks.

18. The method of claim 17, wherein the supplying of the power to the light generating blocks comprises:
boosting the power which is supplied to the light generating blocks corresponding to a white area, above a predetermined reference power when a ratio of white area to dark area is smaller than a predetermined critical ratio.

19. The method of claim 18, wherein the supplying of the power to the light generating blocks comprises boosting the power, which is supplied to the light generating blocks corresponding to the white area, within a range below the predetermined reference power when the ratio of white area to dark area is equal to or greater than the predetermined critical ratio.

* * * * *